US010253842B2

(12) United States Patent
Okaji et al.

(10) Patent No.: US 10,253,842 B2
(45) Date of Patent: Apr. 9, 2019

(54) TORQUE TRANSMISSION APPARATUS

(71) Applicant: Honda Motor Co., Ltd., Tokyo (JP)

(72) Inventors: Tomoya Okaji, Wako (JP); Fumiya Nishii, Wako (JP); Andrii Pydin, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/436,654

(22) Filed: Feb. 17, 2017

(65) Prior Publication Data

US 2017/0254386 A1 Sep. 7, 2017

(30) Foreign Application Priority Data

Mar. 1, 2016 (JP) ................................. 2016-039247

(51) Int. Cl.
*F16H 45/02* (2006.01)
*F16F 15/123* (2006.01)

(52) U.S. Cl.
CPC .. *F16F 15/12353* (2013.01); *F16F 15/12366* (2013.01); *F16H 45/02* (2013.01); *F16H 2045/0226* (2013.01); *F16H 2045/0231* (2013.01); *F16H 2045/0278* (2013.01)

(58) Field of Classification Search
CPC ............. F16H 45/02; F16H 2045/0284; F16H 2045/0221; F16F 15/12353; F16D 13/52; F16D 2300/22
See application file for complete search history.

(56) References Cited

U.S. PATENT DOCUMENTS

| 9,316,299 | B2* | 4/2016 | Doegel | F16H 35/00 |
|---|---|---|---|---|
| 9,739,359 | B2* | 8/2017 | Okaji | F16H 45/02 |
| 9,784,352 | B2* | 10/2017 | Tomiyama | F16H 45/02 |
| 2010/0236228 | A1* | 9/2010 | Degler | F16F 15/145 |
| | | | | 60/338 |
| 2011/0099992 | A1* | 5/2011 | Magerkurth | F16F 15/145 |
| | | | | 60/435 |
| 2011/0192692 | A1* | 8/2011 | Werner | F16F 15/12353 |
| | | | | 192/3.29 |

FOREIGN PATENT DOCUMENTS

| JP | H10159904 A | 6/1998 |
|---|---|---|
| JP | 5051447 B2 | 10/2012 |
| JP | 2015209953 A | 11/2015 |
| JP | 2015212568 A | 11/2015 |

* cited by examiner

*Primary Examiner* — David J Hlavka
(74) *Attorney, Agent, or Firm* — Duft & Bornsen, PC

(57) ABSTRACT

A torque transmission apparatus including an intermediate member disposed in a power transmission path between a first rotor and second rotor; a first elastic member interposed between the first rotor and the intermediate member; a second elastic member interposed between the intermediate member and the second rotor; an inertial body connected to the intermediate member through a third elastic member; and an elastic member supporter supporting the third elastic member to be expandable and contractible. The elastic member supporter supports the third elastic member in a manner of applying an initial load to the third elastic member, in an initial state of the first and second rotors being non-rotating.

20 Claims, 10 Drawing Sheets

FRONT ◀──────▶ REAR

FRONT ←——→ REAR

TORQUE TRANSMISSION APPARATUS

CROSS-REFERENCE TO RELATED APPLICATION

This application is based upon and claims the benefit of priority from Japanese Patent Application No. 2016-039247 filed on Mar. 1, 2016, the content of which is incorporated herein by reference.

BACKGROUND OF THE INVENTION

Field of the Invention

This invention relates to a torque transmission apparatus having a vibration damping function.

Description of the Related Art

As a torque converter having a lock-up mechanism, for example, an apparatus having vibration damping function is known, in order to prevent torsional vibration due to engine rotational fluctuation from transmitting directly to a transmission during operation of the lock-up mechanism. Among apparatuses of this type, the apparatus described in Japanese Examined Patent Publication No. 5051447 (JP5051447B) has a first elastic member, a main mass body and a second elastic member serially connected and interposed between a lock-up clutch and turbine runner. In addition, a dynamic damper is formed by connecting an auxiliary mass body to the main mass body through a third elastic member.

Since in an apparatus of this type the lock-up clutch is vibrated at an excitation frequency dependent on engine rotational speed, the excitation frequency is not constant and vibration damping effect should therefore preferably be ensured with respect to a wide range of excitation frequencies. However, since the apparatus described in JP5051447B is structured simply to have the auxiliary mass body connected to the main mass body through the third elastic member, vibration damping effect is exhibited only in the vicinity of excitation frequencies corresponding to the set frequency of the dynamic damper determined by the spring constant of the third elastic member and the inertia of the auxiliary mass body.

SUMMARY OF THE INVENTION

According to an aspect of the present invention, a torque transmission apparatus for transmitting a torque from a first rotor rotating around an axial line to a second rotor, includes: an intermediate member disposed in a power transmission path between the first rotor and second rotor; a first elastic member interposed between the first rotor and the intermediate member; a second elastic member interposed between the intermediate member and the second rotor; a third elastic member; an inertial body connected to the intermediate member through the third elastic member; and an elastic member supporter configured to support the third elastic member to be expandable and contractible, wherein the elastic member supporter supports the third elastic member in a manner of applying an initial load to the third elastic member, in an initial state of the first and second rotors being non-rotating.

According to another aspect of the present invention, a torque converter includes: the above torque transmission apparatus; a pump impeller to which a torque from an power source is input; a cover fixed on the pump impeller; a turbine runner arranged opposite the pump impeller; a lock-up clutch including a clutch piston arranged opposite a side wall of the cover to be engaged with the cover or disengaged from the cover by driving of the clutch piston; and a turbine hub configured to output the torque from the power source through the lock-up clutch and the torque transmission apparatus to a driven component.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
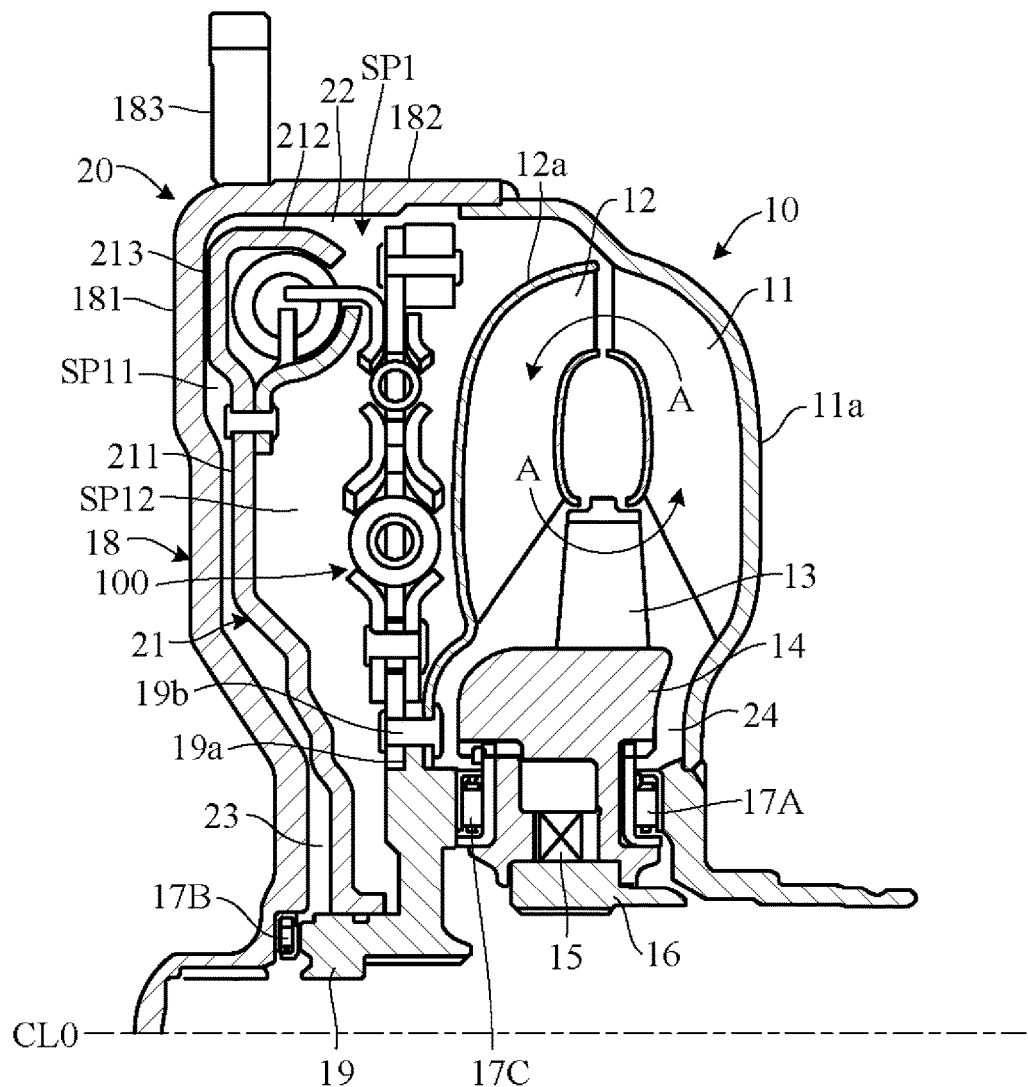
FIG. 1 is a cross-sectional diagram of a torque converter incorporating a torque transmission apparatus according to an embodiment of the present invention.

Below, referring to FIGS. 1 to 14, an embodiment of the present invention will be explained. The torque transmission apparatus according to the embodiment of the present invention is, for example, utilized in a vehicle torque converter having a lock-up mechanism. FIG. 1 is a cross-sectional view of a torque converter incorporating the torque transmission apparatus according to the embodiment of the present invention. For convenience in the following, direction of an axis CL0 shown in the drawings is defined as front-rear direction, and its components are explained in accordance with this definition.

As shown in FIG. 1, a torque converter 10 has a pump impeller 11 connected to an output shaft (crankshaft) of an engine (not shown) and a turbine runner 12 connected to an input shaft of a transmission (not shown). The pump impeller 11 and turbine runner 12 are provided in a manner rotatable around the axis CL0, respectively. The turbine runner 12 is deployed in front of and facing the pump impeller 11, and a fluid (oil) circulation passage indicated by arrows A is formed between the pump impeller 11 and the turbine runner 12.

A stator 13 is located between the pump impeller 11 and the turbine runner 12 to be radially inward of the pump impeller 11 and the turbine runner 12. The stator 13 is supported on a stator hub 14 provided radially inward thereof, and the stator hub 14 is supported on a stator shaft 16 through a one-way clutch 15. The stator shaft 16 has its inner peripheral surface non-rotatably fixed on a case (not shown) of the transmission. A thrust bearing 17A is provided between the stator hub 14 and a shell 11a of the pump impeller 11.

A cover 18 is disposed forward of the turbine runner 12. The cover 18 has a first plate section 181 extending substantially radially and a second plate section 182 bent to extend rearward from a radially outer edge of the first plate section 181. The second plate section 182 is of substantially cylindrical shape, and its rear end is joined to the shell 11a of the pump impeller 11 by welding to form a space SP1 between the cover 18 and the turbine runner 12. A boss 183 is provided to project radially outward from an outer peripheral surface of the second plate section 182, and torque from the output shaft of the engine is input to the pump impeller 11 through the boss 183 and the cover 18.

A turbine hub 19 is disposed between the stator hub 14 and the first plate section 181 of the cover 18. The input shaft of the transmission (not shown) is located radially inward of the turbine hub 19. The turbine hub 19 is fixed on the input shaft of the transmission through splines formed on its inner peripheral surface and rotates integrally with the input shaft. A thrust bearing 17B is provided between the turbine hub 19 and the cover 18, and a thrust bearing 17C is provided between the turbine hub 19 and the stator hub 14.

A flange 19a is provided to project radially outward from an outer peripheral surface of the turbine hub 19, and a radially inner edge of a shell 12a of the turbine runner 12 is fixed to a rear surface of the flange 19a by fastening members 19b such as pins. Alternatively, the shell 12a can be fixed by welding. The radially outer edge of the shell 12a is bent to extend rearward.

When the pump impeller 11 of this torque converter 10 is rotated by rotation of the engine output shaft, oil flows from the pump impeller 11 to the turbine runner 12. After driving the turbine runner 12, this oil circulates through the stator 13 to the pump impeller 11. In other words, oil flows between the pump impeller 11, turbine runner 12 and stator 13 through the circulation passage "A" of FIG. 1. Owing to this oil flow, the engine output shaft rotation is transmitted to the input shaft of the transmission at reduced speed and amplified torque.

The torque converter 10 includes a lock-up clutch 20 which mechanically couples the turbine hub 19 and cover 18. The lock-up clutch 20 includes a clutch piston 21 disposed behind and facing the first plate section 181 of the cover 18. The radially inner end of the clutch piston 21 is formed annular toward the rear, and an inner peripheral surface of the clutch piston 21 fits onto the outer peripheral surface of the turbine hub 19 in a manner slidable forward and rearward, whereby the clutch piston 21 is supported to be rotatable relative to the turbine hub 19.

The clutch piston 21 has a first plate section 211 extending substantially radially and a second plate section 212 extending rearward from a radially outer edge of the first plate section 211. A front face of the first plate section 211 has a friction lining 213 attached to its radially outer end, and the clutch piston 21 and cover 18 are frictionally engageable through the friction lining 213. In the frictionally engaged state of the clutch piston 21 and cover 18, torque input to the clutch piston 21 is transmitted to the turbine hub 19 through a torque transmission apparatus 100. Although the torque transmission apparatus 100 is part of the torque converter 10 in the embodiment, its configuration is explained later herein.

The space SP1 between the pump impeller 11 and the cover 18 is partitioned by the clutch piston 21 into a front working chamber SP11 and a rear working chamber SP12. The front working chamber SP11 and rear working chamber SP12 communicate through a gap 22 between the second plate section 212 of the clutch piston 21 and the second plate section 182 of the cover 18. Oil can be supplied by a pump (not shown) into the front working chamber SP11 through a first fluid channel 23 between the cover 18 and the clutch piston 21 and into the rear working chamber SP12 through a second fluid channel 24 between the shell 11a of the pump impeller 11 and the stator hub 14. The flow of oil into the front working chamber SP11 and rear working chamber SP12 is controlled by a valve apparatus (not shown).

When oil is supplied from the pump through the first fluid channel 23 to the front working chamber SP11, pressure in the front working chamber SP11 rises above that in the rear working chamber SP12, thereby pressing the clutch piston 21 rearward. As a result, the lock-up clutch 20 is disengaged. In this state, rotation of the engine output shaft is transmitted through the cover 18 to the pump impeller 11, and further to the turbine runner 12 by oil flowing through the circulation passage "A" between the pump impeller 11, turbine runner 12 and stator 13. Rotation of the turbine runner 12 is transmitted through the turbine hub 19 to the input shaft of the transmission.

On the other hand, when oil is supplied from the pump through the second fluid channel 24 to the rear working chamber SP12, pressure in the rear working chamber SP12 rises above that in the front working chamber SP11, thereby pressing the clutch piston 21 forward. As a result, the clutch piston 21 frictionally engages the cover 18 through the friction lining 213, thereby engaging the lock-up clutch 20. That is to say, the lock-up mechanism operates. In this state, rotation of the engine output shaft is transmitted through the cover 18, clutch piston 21, torque transmission apparatus 100 and turbine hub 19 to the input shaft of the transmission. In other words, the turbine hub 19 is engaged with the cover 18 not through fluid but mechanically. As a result, torque transmission loss caused by fluid slip can be prevented.

When the clutch piston 21 and the turbine hub 19 directly connect during operation of the lock-up mechanism, torsional vibration caused by rotational fluctuation of the engine is directly transmitted to the transmission. To avoid this, the torque transmission apparatus 100 having vibration damping function is installed between the clutch piston 21 and the turbine hub 19.

Figure 2:
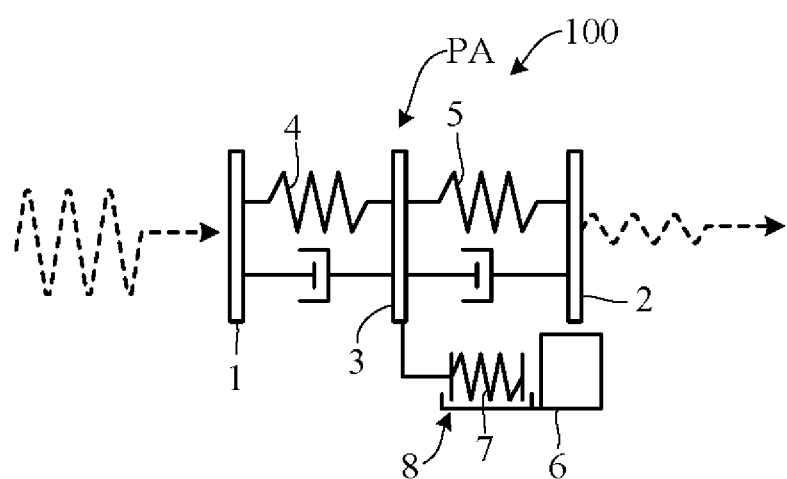
FIG. 2 is a diagram showing a vibration model of the torque transmission apparatus.

FIG. 2 is a diagram showing a vibration model of the torque transmission apparatus 100. In FIG. 2, the torque transmission apparatus 100 is generalized as one which transmits torque from a first rotor 1 (input member) to a second rotor 2 (output member). In the present embodiment, the first rotor 1 includes the clutch piston 21 and the second rotor 2 includes an output plate 60 (FIG. 13) which rotates integrally with the turbine hub 19.

As seen in FIG. 2, the torque transmission apparatus 100 includes an intermediate member 3 disposed in a power transmission path PA between the first rotor 1 and second rotor 2, a first elastic member 4 and a second elastic member 5 respectively interposed between the first rotor 1 and intermediate member 3 and between the intermediate member 3 and the second rotor 2, and an inertial body 6 connected to the intermediate member 3 through a third elastic member 7. In other words, the torque transmission apparatus 100 functions as a serial damper by serially connecting the first elastic member 4 and the second elastic member 5 via the intermediate member 3 and functions as a dynamic damper by connecting the inertial body 6 to the intermediate member 3 via the third elastic member 7.

Figure 3A:
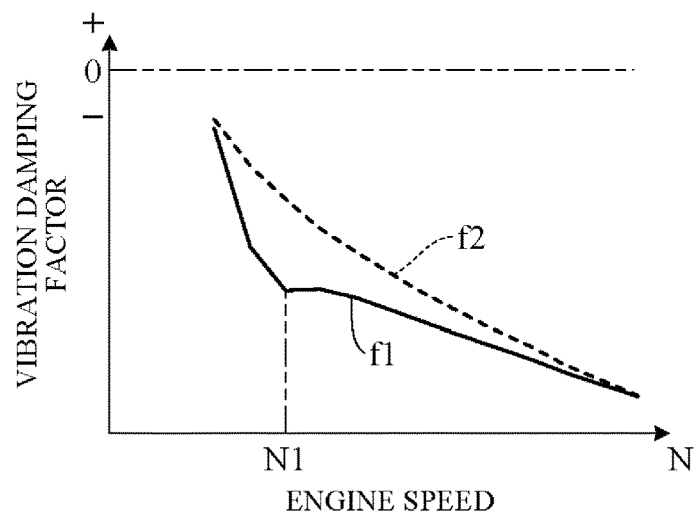
FIG. 3A is a first diagram showing a vibration damping effect attributable to difference in damper design.
Figure 3B:
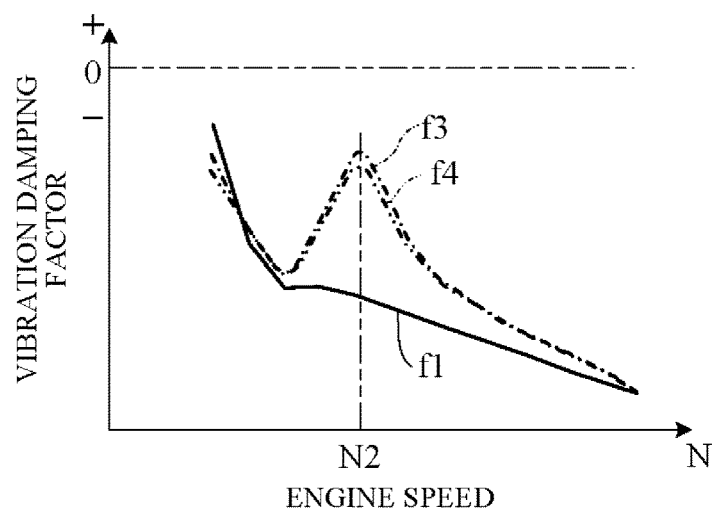
FIG. 3B is a second diagram showing a vibration damping effect attributable to difference in damper design.

FIGS. 3A and 3B are diagrams showing vibration damping effects attributable to difference in damper design. In the diagrams, the horizontal and vertical axes respectively represent engine speed N and vibration damping factor. Where vibration amplitude (maximum amplitude) of the first rotor 1 is A1 and vibration amplitude (maximum amplitude) of the second rotor 2 is A2, damping factor is defined by (A1−A2)/A1. Therefore, damping factor is represented as minus, and damping factor (damping effect) increases going downward in the diagrams. In FIGS. 3A and 3B, characteristic curve f1 (solid line curve) represents the characteristics of the torque transmission apparatus 100 of the present embodiment, characteristic curve f2 (dotted line curve) represents the characteristics of the vibration damping effect by the series damper only, characteristic curve f3 (one-dot-dashed line) represents the characteristics of the vibration damping effect when the dynamic damper is connected to the first rotor 1, and characteristic curve f4 (two-dot-dashed line) represents the characteristics of the vibration damping effect when the dynamic damper is connected to the second rotor 2.

As shown in FIG. 3A, when a series damper and dynamic damper are used in combination as in the torque transmission apparatus 100 of the present embodiment (characteristic curve f1), vibration damping effect can be enhanced in comparison with the case of only a series damper (characteristic curve f2) particularly in the vicinity of a certain rotational speed N1. Further, as seen in FIG. 3B, when a dynamic damper is connected to the first rotor 1 or second rotor 2 having large inertial mass (characteristic curves f3 and f4), vibration damping factor is degraded at a certain engine rotational speed N2 by the effect of antiresonance. In contrast, when the dynamic damper is connected to the intermediate member 3 as in this embodiment (characteristic curve f1), no effect of antiresonance arises and vibration damping effect can be enhanced. In light of the foregoing, vibration damping effect is enhanced in the present embodiment by combined use of a series damper and a dynamic damper, with the dynamic damper being connected to the intermediate member 3.

In such a dynamic damper, vibration damping effect can be increased at a specific frequency (hereinafter called "damper frequency") fdd [Hz] determined by the structures of the third elastic member 7 and the inertial body 6. Damper frequency fdd is expressed as follows using spring constant k [Nm/deg] of the third elastic member 7 and inertial (inertial moment) Idd [kgm$^2$] of the inertial body 6:

$$fdd = \tfrac{1}{2}\pi \cdot \sqrt{(k/Idd)} \tag{I}$$

Figure 4:
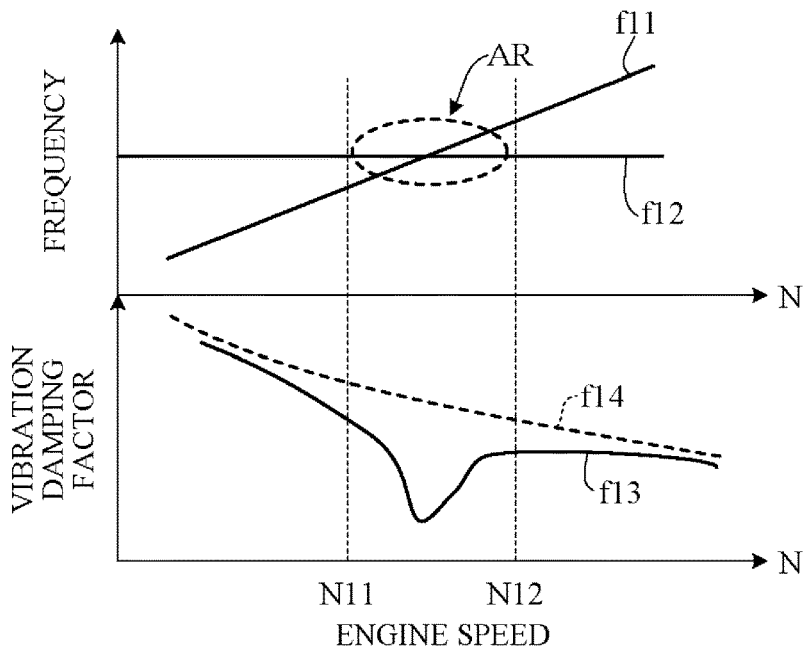
FIG. 4 is a diagram showing relation between damper frequency and excitation frequency, along with vibration damping effect of the dynamic damper, in a case of using a dynamic damper of fixed spring constant.

FIG. 4 is a diagram showing relation between damper frequency fdd and excitation frequency, along with vibration damping effect of the dynamic damper, in a case of using a dynamic damper of fixed spring constant k (case of no pressurization applied). Characteristic curve f11 here represents excitation frequency characteristics with respect to engine speed N [rpm], characteristic curve f12 represents damper frequency fdd characteristics with respect to engine speed N, and characteristic curve f13 represents vibration damping factor characteristics with respect to engine speed N. Further, the dotted characteristic curve f14 represents damping factor characteristics with respect to engine speed N when no dynamic damper is provided.

As indicated by characteristic curve f11, excitation frequency increases at a fixed rate in proportion to increase of engine speed N. On the other hand, as indicated by characteristic curve f12, damper frequency fdd determined by the above equation (I) remains constant irrespective of change in engine speed N. Therefore, as indicated by characteristic curve f13, in region AR where characteristic curve f11 and characteristic curve f12 intersect, more exactly, near the engine speed in region AR at which absolute value difference between characteristic curve f11 and characteristic curve f12 falls within a certain value range (N11≤N≤N12), vibration damping factor becomes large, whereby a vibration damping effect by the dynamic damper is achieved.

On a related point, it is preferable from the aspect of fuel economy for the engine speed at which the lock-up clutch 20 engages (lock-up rotational speed) to be set low. However, setting the lock-up rotational speed low poses a risk of pronounced vibration occurring in a region of low engine speed N (first region). But when damper frequency fdd is set to a low value in order to attenuate this vibration, adequate damping effect cannot be realized in a second region of higher engine speed than that of the first region.

Therefore, in the present embodiment, adequate damping effect is achieved across a broad range of engine speeds extending from the first region to the second region, as shown in FIG. 2, by using a spring support 8 to support the third elastic member 7 in an initial state which is a state shrunk a predetermined amount from its natural length. In other words, the third elastic member 7 is applied with a preset load (pressurization) and the third elastic member 7 is supported in this state by the spring support 8 to be expandable and contractible.

Figure 5:
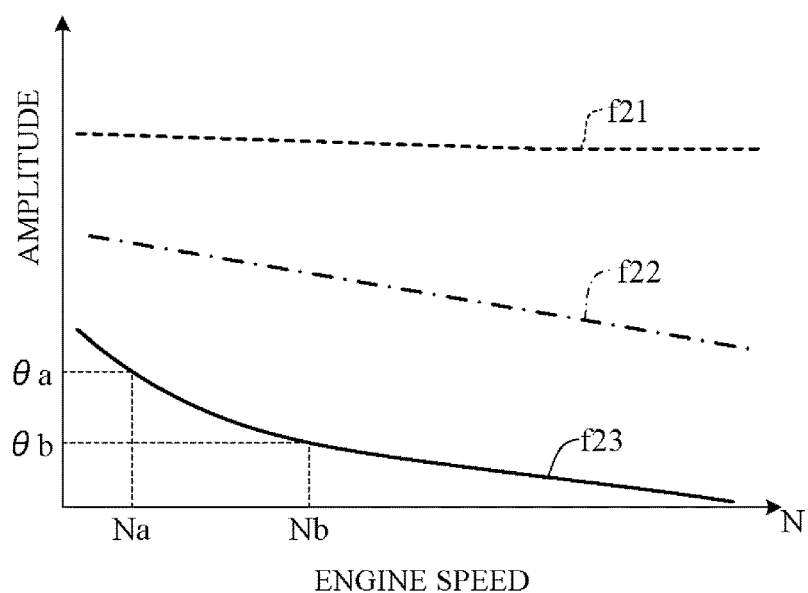
FIG. 5 is a diagram showing an amplitude of the dynamic damper with respect to the engine speed.

Now follows an explanation of why application of a preset load to the third elastic member 7 improves damping performance over a broad range of engine speeds. FIG. 5 is a diagram showing relation between different dynamic damper (the inertial body 6) parameter amplitudes and engine speed N. Characteristic curve f21 represents relation between amplitude of torque T [N·m] acting on the dynamic damper (torque amplitude) and engine speed N, characteristic curve f22 represents relation between amplitude of angular velocity dθ/dt [deg/s] of the dynamic damper (angular velocity amplitude) and engine speed N, and characteristic curve f23 represents relation between amplitude of torsion angle θ [deg] of the inertial body 6 relative to the intermediate member 3 (torsion angle amplitude) and engine speed N.

Torque T is generally expressed by the following equation (II) using angular velocity $d^2\theta/dt^2$ [deg/s$^2$] and inertia (inertial moment) "I" of the dynamic damper. Moreover, using maximum amplitude A of torque T and frequency f corresponding to excitation frequency, torque T is also expressed by the following equation (III):

$$T = I \cdot d^2\theta/dt^2 \tag{II}$$

$$T = A \cdot \sin(2\pi ft) \tag{III}$$

Using the above equations (II) and (III) to calculate torsion angle θ by second-order integrating torque T, torsion angle θ is expressed by the following equation (IV):

$$\theta = A/((2\pi f)^2 I) \cdot \sin(2\pi ft) \quad \text{(IV)}$$

By the above equation (IV), torsion angle θ is inversely proportional to the square of frequency f. On the other hand, frequency f increases with increasing engine speed N (characteristic curve f11 of FIG. 4). Therefore, as shown by characteristic curve f23 of FIG. 5, torsion angle θ decreases quadratically with increasing engine speed N. For example, torsion angle amplitude is θa when engine speed is Na, and torsion angle amplitude is θb (<θa) when engine speed is Nb (>Na).

Figure 6:
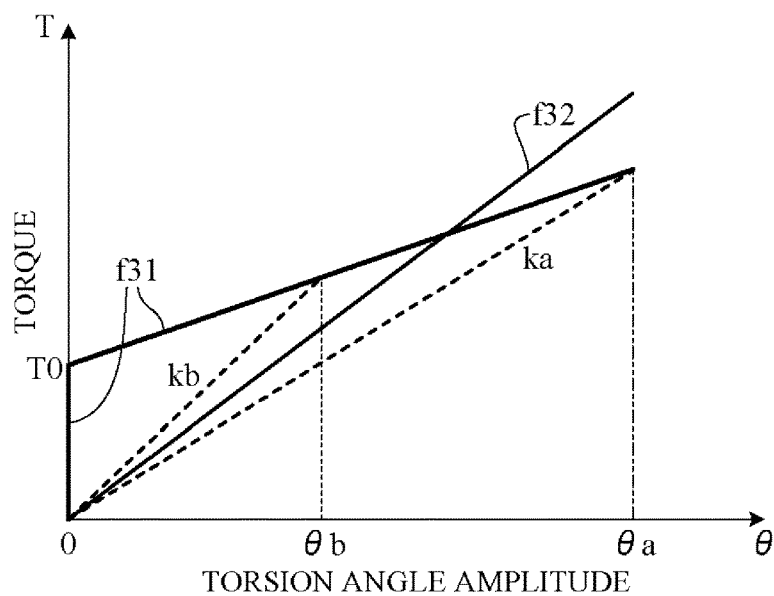
FIG. 6 is a diagram showing spring characteristics of the dynamic damper included in the torque transmission apparatus according to the present embodiment of the invention.

FIG. 6 is a diagram showing spring characteristics of the dynamic damper according to the present embodiment of the invention. In the diagram, the horizontal and vertical axes respectively represent torsion angle θ and torque T. Defining preset load applied to the third elastic member 7 as T0 and spring constant of the third elastic member 7 as k0, spring characteristics of the dynamic damper are expressed by the following equation (V), from which the spring characteristics of characteristic curve f31 of FIG. 6 are obtained.

$$T = k0 \cdot \theta + T0 \quad \text{(V)}$$

Therefore, spring constant ka corresponding to torsion angle amplitude θa when engine speed is Na and spring constant kb corresponding to torsion angle amplitude θb when engine speed is Nb differ from each other, i.e., kb>ka. Namely, since torsion angle amplitude θ decreases with increasing engine speed, apparent spring constant increases. Characteristic curve f32 of FIG. 6 represents spring characteristics when no preset load is applied to the third elastic member 7, in which case spring constant is constant irrespective of torsion angle amplitude θ.

Figure 7:
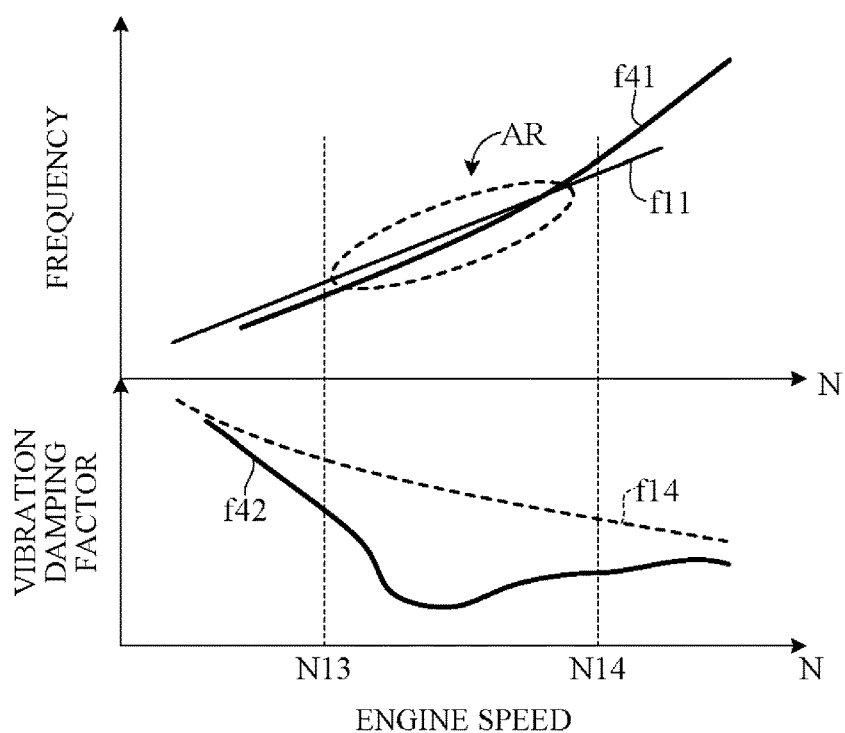
FIG. 7 is a diagram showing vibration damping effect by the torque transmission apparatus according to the present embodiment of the invention.

FIG. 7 is a diagram showing vibration damping effect by the torque transmission apparatus 100 according to the present embodiment of the invention. Characteristic curve f11 and characteristic curve f14 here are the same as those in FIG. 4. Characteristic curve f41 represents damper frequency fdd characteristics with respect to engine speed N, and characteristic curve f42 represents vibration damping factor characteristics with respect to engine speed N. As stated in the foregoing, in the case of the torque transmission apparatus 100 according to the present embodiment, spring constant increases along with increasing engine speed N. Therefore, the spring constant k of the above equation (I) becomes variable and, as indicated by characteristic curve f41, damper frequency fdd rises along with increasing engine speed N.

Owing to this, as shown in FIG. 7, region AR where characteristic curve f11 and characteristic curve f41 intersect, more exactly region AR in which absolute value difference between characteristic curve f11 and characteristic curve f41 falls within a certain value range, expands to larger than region AR of FIG. 4. Therefore, as indicated by characteristic curve f42, vibration damping factor can be enlarged over a broad range of engine speeds (N13≤N≤N14) and damping performance can be enhanced over a broad range.

Figure 8:
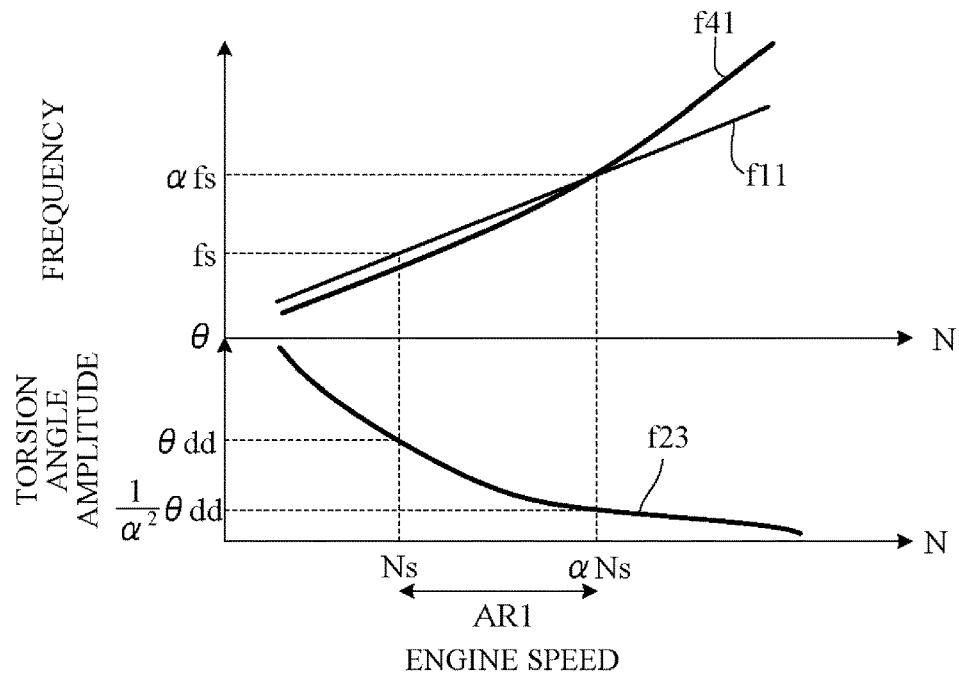
FIG. 8 is a first diagram for explaining how to set spring characteristics of the dynamic damper.

Next follows an explanation of a method of setting the spring characteristics of the dynamic damper. FIGS. 8 to 11 are diagrams for explaining this aspect. First, in order to improve damping performance by the dynamic damper, a first rotational speed constituting lower limit of engine speed and a second rotational speed constituting upper limit of engine speed are set. At this time, as shown in FIG. 8, the first rotational speed is defined as Ns and the second rotational speed as α·Ns. Range AR1 from Ns to α·Ns is a range in which damping performance is to be enhanced. Symbol a here is ratio of second rotational speed to first rotational speed (=second rotational speed/first rotational speed), where α>1.

Characteristic curve f11 and characteristic curve f41 in FIG. 8 are the same as those shown in FIG. 7, and characteristic curve f23 is the same as that shown in FIG. 5. Torsion angle amplitude θdd of the dynamic damper when engine speed is first rotational speed Ns (maximum amplitude) can be determined from characteristic curve f23 of FIG. 8. Further, since torsion angle amplitude θ decreases quadratically along with increasing engine speed N as shown by characteristic curve f23, torsion angle amplitude is $1/\alpha^2 \cdot \theta dd$ when engine speed is second rotational speed α·Ns.

By the excitation frequency characteristic curve f11 of FIG. 8, excitation frequency is fs (first frequency) when engine speed is first rotational speed Ns and excitation frequency is α·fs (second frequency) when engine speed is second rotational speed α·Ns. Therefore, vibration at first rotational speed Ns and second rotational speed α·Ns can be favorably attenuated by bringing the damper frequencies when engine speeds are first rotational speed Ns and second rotational speed α·Ns into coincidence with first frequency fs and second frequency α·fs, respectively. First frequency fs and second frequency α·fs are respectively lower limit frequency and upper limit frequency of vibration to be attenuated.

Although a preset load is applied to the third elastic member 7 in the present embodiment, in a case of not applying a preset load, vibration at first rotational speed Ns is suppressed by setting damper frequency fdd to first frequency fs and vibration at second rotational speed α·Ns is suppressed by setting damper frequency fdd to second frequency α·fs. At this time, first frequency fs and second frequency α·fs are expressed using spring constant k (>k0) of the above equation (I) by the following equations (VI) and (VII), respectively.

$$fs = 1/2\pi \cdot \sqrt{(k/Idd)} \quad \text{(VI)}$$

$$\alpha \cdot fs = 1/2\pi \cdot \sqrt{(\alpha^2 \cdot k/Idd)} \quad \text{(VII)}$$

By the above equation (VI), spring constant becomes k when engine speed is first rotational speed Ns. Spring characteristics at this time are represented by characteristic curve f51 of FIG. 9, and torque T corresponding to torsion angle amplitude θdd becomes k·θdd. Further, by the above equation (VII), spring constant when engine speed is second rotational speed α·Ns becomes $\alpha^2 \cdot k$. Spring characteristics at this time are represented by characteristic curve f52 of FIG. 9, and torque T corresponding to torsion angle amplitude $1/\alpha^2 \cdot \theta dd$ becomes k·θdd. On the other hand, by the above equation (V), torque T corresponding to torsion angle amplitude θdd in the dynamic damper of the present embodiment becomes k0·θdd+T0, and torque T corresponding to torsion angle amplitude $1/\alpha^2 \cdot \theta dd$ becomes $(k0 \cdot \theta dd)/\alpha^2 + T0$.

Figure 9:
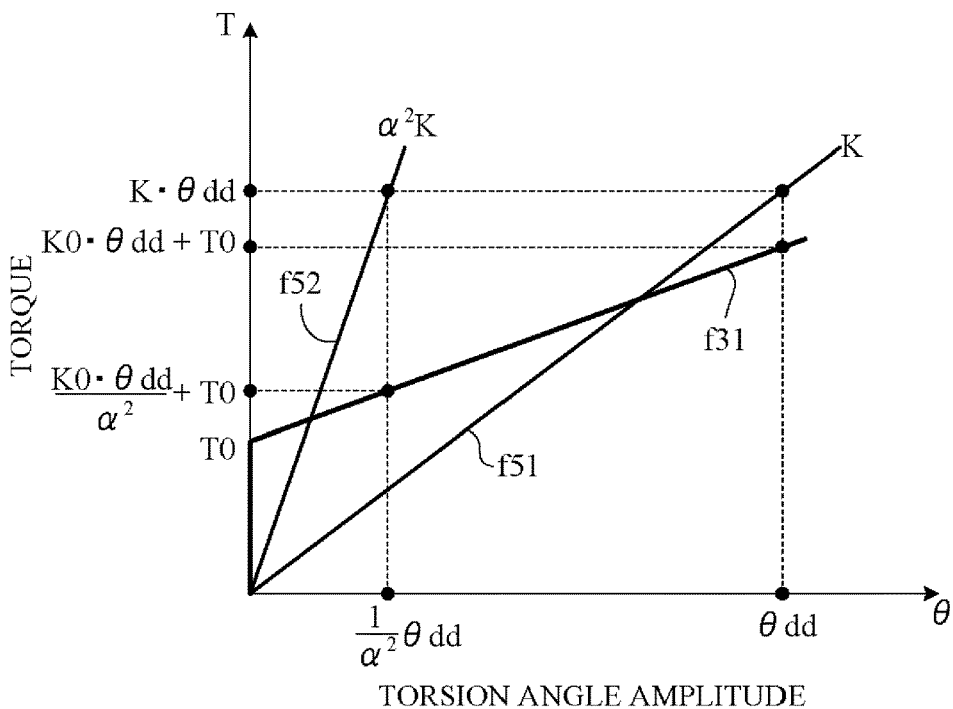
FIG. 9 is a second diagram for explaining how to set spring characteristics of the dynamic damper.
Figure 10A:
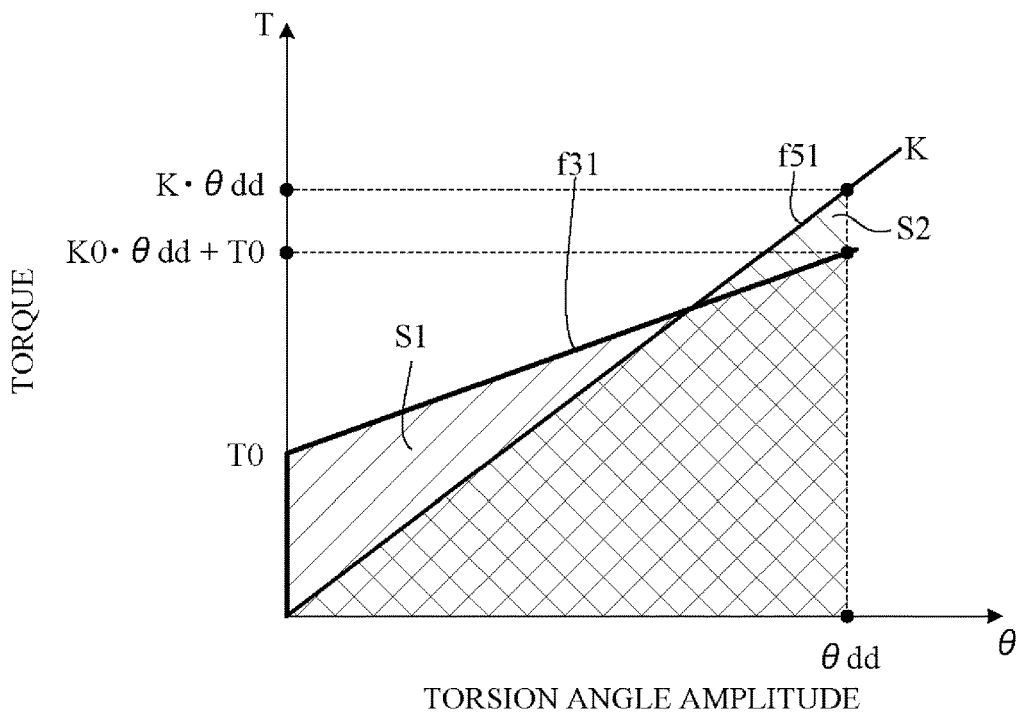
FIG. 10A is a third diagram for explaining how to set spring characteristics of the dynamic damper.

In FIG. 9, vibration absorption energy of the dynamic damper is represented by area under the respective characteristic curves f31, f51 and f52. FIG. 10A shows area S1 under characteristic curve f31 and area S2 under the characteristic curve f51 at torsion angle amplitude θdd when engine speed is first rotational speed Ns. If the areas S1 and S2 are equal, vibration absorption energy when preset load is applied and vibration absorption energy when preset load is not applied are equal. Therefore, apparent spring constant of the third elastic member 7 when preset load is applied is equal to spring constant k when preset load is not applied, so that vibration excited at first frequency fs can be attenuated.

Figure 10B:
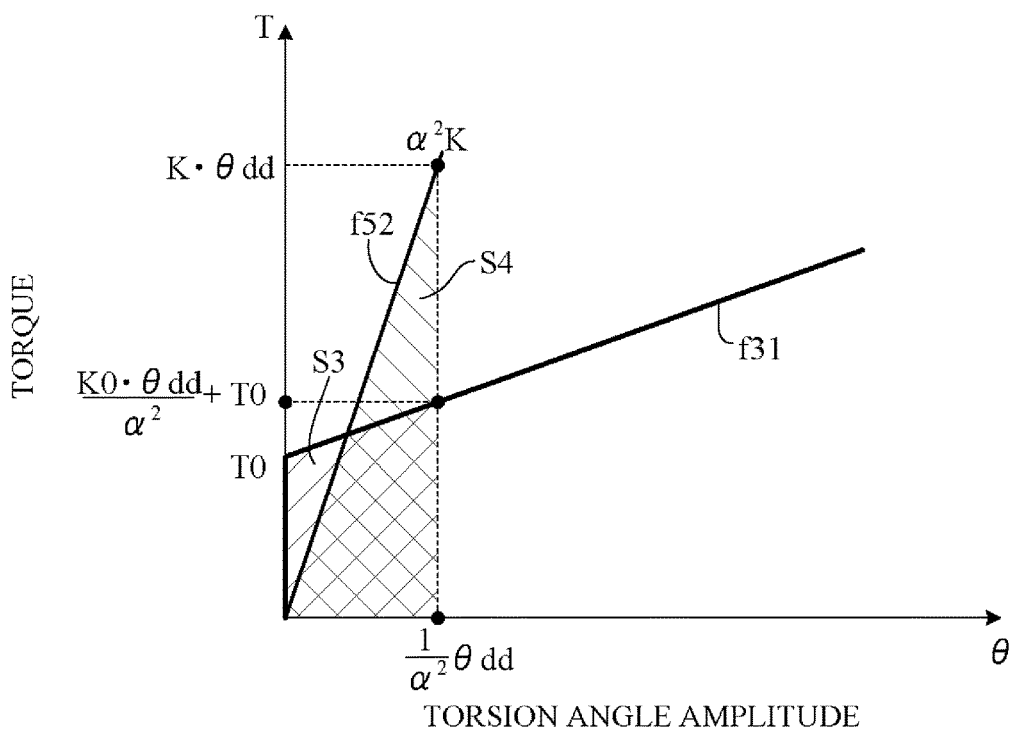
FIG. 10B is a fourth diagram for explaining how to set spring characteristics of the dynamic damper.

FIG. 10B shows area S3 under characteristic curve f31 and area S4 under the characteristic curve f52 at torsion angle amplitude $1/\alpha^2 \cdot \theta dd$ when engine speed is second rotational speed $\alpha \cdot Ns$. If the areas S3 and S4 are equal, vibration absorption energy when preset load is applied and vibration absorption energy when preset load is not applied are equal. Therefore, apparent spring constant of the third elastic member 7 when preset load is applied is equal to spring constant $\alpha^2 \cdot k$ when preset load is not applied, so that vibration excited at second frequency $\alpha \cdot fs$ can be attenuated.

As set out in the foregoing, in order to attenuate vibration excited at first frequency fs, it suffices for vibration absorption energy when preset load is applied and vibration absorption energy when preset load is not applied to be equal when engine speed is first rotational speed Ns. In other words, it suffices for areas S1 and S2 in FIG. 10A to be equal, and for this it suffices to satisfy the following equation (VIII):

$$\tfrac{1}{2} \cdot k \cdot \theta dd^2 = \tfrac{1}{2} \cdot (2 \cdot T0 + k0 \cdot \theta dd) \cdot \theta dd \quad\quad (VIII)$$

On the other hand, in order to attenuate vibration excited at second frequency $\alpha \cdot fs$, it suffices for vibration absorption energy when preset load is applied and vibration absorption energy when preset load is not applied to be equal when engine speed is second rotational speed $\alpha \cdot Ns$. In other words, it suffices for areas S3 and S4 in FIG. 10B to be equal, and for this it suffices to satisfy the following equation (IX):

$$\tfrac{1}{2} \alpha^2 \cdot k \cdot \theta dd^2 = \tfrac{1}{2} \cdot (2 \cdot T0 + k0 \cdot \theta dd/\alpha^2) \cdot \theta dd/\alpha^2 \quad\quad (IX)$$

The following equation (X) is obtained by organizing the above equation (VIII), and the following equation (XI) is obtained by organizing the above equation (IX).

$$T0 = -\tfrac{1}{2} \cdot \theta dd \cdot k0 + \tfrac{1}{2} \cdot k \cdot \theta dd \quad\quad (X)$$

$$T0 = -\tfrac{1}{2} \alpha^2 \cdot \theta dd \cdot k0 + \tfrac{1}{2} \cdot k \cdot \theta dd \quad\quad (XI)$$

Figure 11:
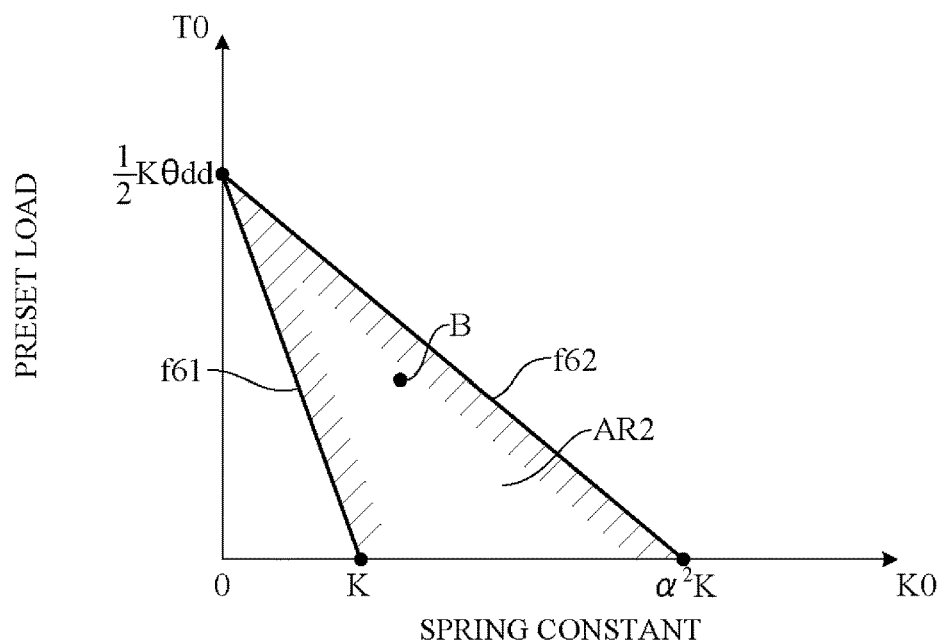
FIG. 11 is a fifth diagram for explaining how to set spring characteristics of the dynamic damper.

Characteristic curves f61 and f62 of FIG. 11 represent the characteristics of the above equations (X) and (XI) in a graph with spring constant k0 of the third elastic member 7 plotted on the horizontal axis and preset load T0 applied to the third elastic member 7 plotted on the vertical axis. In order to enhance damping performance at engine speeds between first rotational speed Ns and second rotational speed $\alpha \cdot Ns$, it suffices to set spring constant k0 and preset load T0 at T0>0 and at a point in region AR2 between characteristic curve f61 and characteristic curve f62 of FIG. 11 (e.g., B point). Namely, it suffices for the ratio of the preset load T0 to the spring constant k0 (T0/k0) to satisfy the following equation (XII):

$$\theta dd/2\alpha^2 < T0/k0 < \theta dd/2 \quad\quad (XII)$$

The range of engine speeds over which damping performance can be improved expands in proportion as value of a in the above equation (XII) is increased. The value of the left side of the above equation (XII) approaches 0 as value of coefficient $\alpha$ increases. The above equation (III) can therefore be rewritten as the following equation (XIII):

$$0 < T0/k0 < \theta dd/2 \quad\quad (XIII)$$

Figure 12:
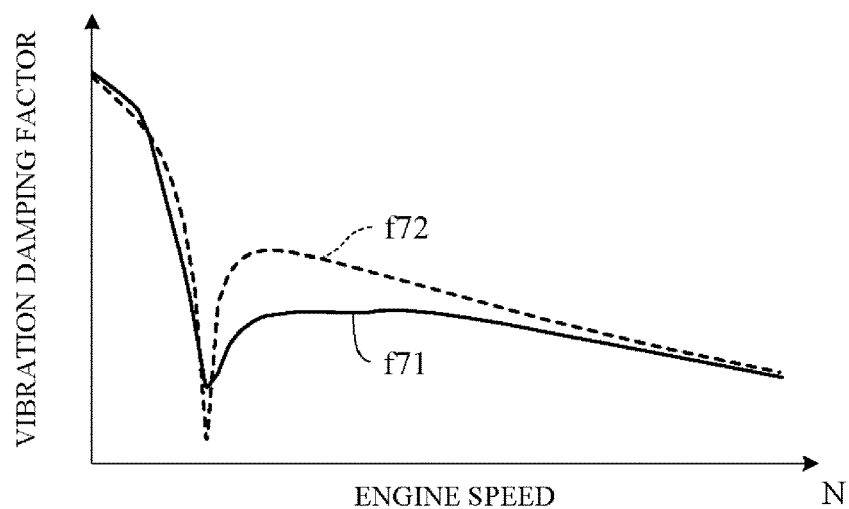
FIG. 12 is a diagram showing vibration damping effect when preset load and spring constant of the dynamic damper are set at B point of FIG. 11.

FIG. 12 (characteristic curve f71) is a diagram showing damping effect when preset load T0 and spring constant k0 are set at B point of FIG. 11. Characteristic curve f72 (dotted line) in the diagram represents the characteristics when preset load is not applied. By setting the dynamic damper so that ratio of the preset load T0 to the spring constant k0 (T0/k0) satisfies a predetermined relation, damping performance can be enhanced over a broad range of engine speeds, as shown by characteristic curve f71.

Figure 13:
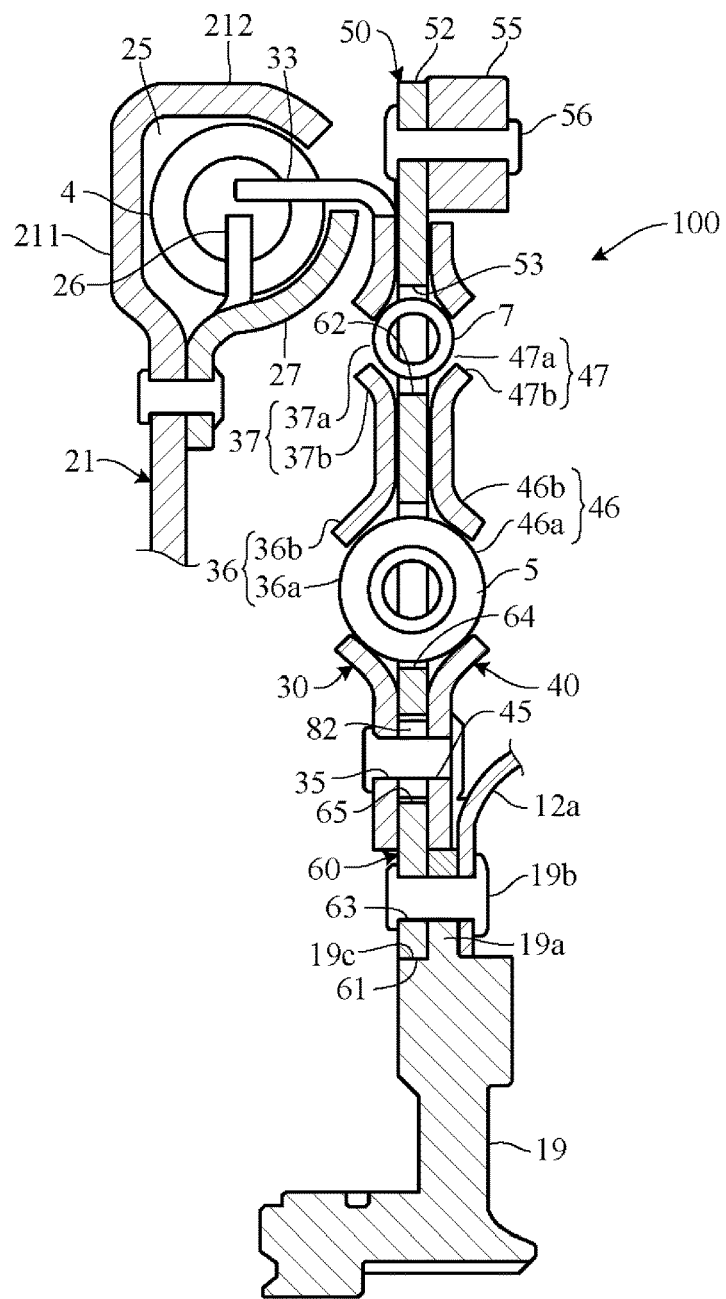
FIG. 13 is an enlarged view of the torque transmission apparatus of FIG. 1.
Figure 14:
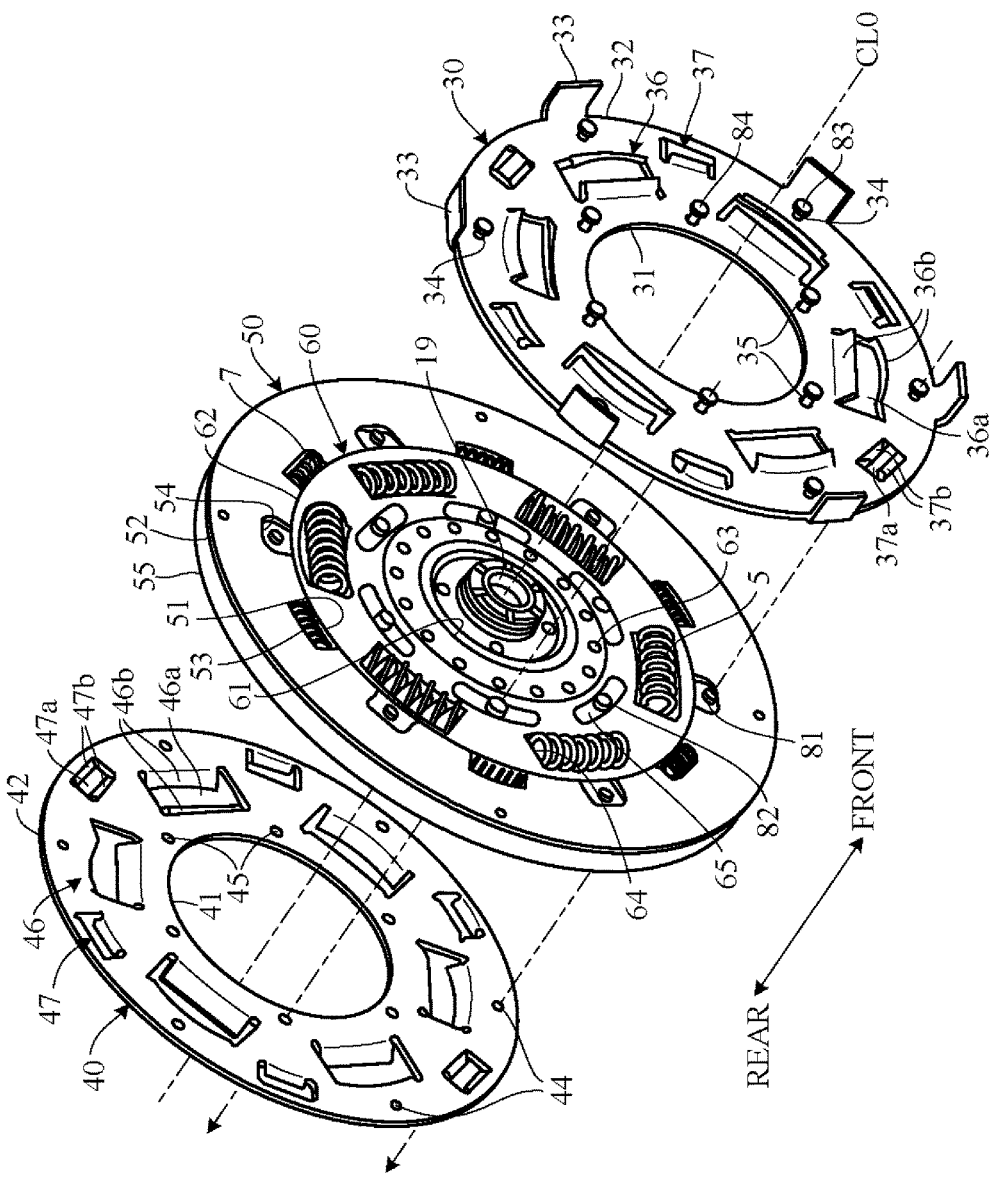
FIG. 14 is an exploded perspective view of the torque transmission apparatus of FIG. 1.

A concrete configuration of the torque transmission apparatus 100 of the present embodiment of the invention is explained next. FIG. 13 is an enlarged view of the torque transmission apparatus 100 of FIG. 1, and FIG. 14 is an exploded perspective view of the torque transmission apparatus 100. As shown in FIG. 13, a spring housing 25 is formed along the circumferential direction at the intersecting portion of the first plate section 211 and second plate section 212 of the clutch piston 21, and multiple first elastic member 4 are circumferentially housed in the spring housing 25. The first elastic member 4 is composed of coil springs.

Multiple spring supports 26 are provided on the clutch piston 21 circumferentially at a predetermined pitch, i.e., at predetermined angular spacing. The spring supports 26 are erected to project from the rear surface of the clutch piston 21 into the spring housing 25, and the longitudinal ends of the first elastic member (springs) 4 are supported by the spring supports 26. A cover 27 is attached to the rear surface of the clutch piston 21 opposite the intersecting portion of the first plate section 211 and second plate section 212 to cover the periphery of the first elastic member 4. The cover 27 is formed to have a curved shape corresponding to the circumferential surface shape of the first elastic member 4.

A pair of plate members (front plate 30 and rear plate 40) constituting the intermediate member 3, a connecting plate 50 constituting the inertial body 6, and an output plate 60 constituting the second rotor 2 are installed behind the clutch piston 21. The front plate 30 and rear plate 40 are spaced forward-rearward and extend radially in parallel. The connecting plate 50 and output plate 60 are interposed between the front plate 30 and rear plate 40. The output plate 60 is located radially inside the ring-shaped connecting plate 50 and is fastened by a fastening member 19b to a front end surface of a flange 19a of the turbine hub 19.

As shown in FIGS. 13 and 14, the front plate 30 and rear plate 40 are substantially ring-shaped and respectively have circular inner peripheral surfaces 31 and 41, and outer peripheral surfaces 32 and 42, all of which are centered on the axis CL0. Multiple (6 in the drawing) spring supports 33 are provided circumferentially to project forward from the outer peripheral surface 32 of the front plate 30 at predetermined angular intervals (60°). The spring supports 33 support the longitudinal ends of the first elastic member (springs) 4. As a result, the ends of the first elastic member (springs) 4 are supported between the spring supports 26 of the clutch piston 21 and the spring supports 33 of the front plate 30, whereby torque of the clutch piston 21 is transmitted through the first elastic member 4 to the front plate 30.

Multiple (6 each in the drawing) pin holes 34 and 44 are formed circumferentially at the radially outer sides of the front plate 30 and rear plate 40 at predetermined angular intervals (60°), and multiple (6 each in the drawing) pin holes 35 and 45 are formed circumferentially at the radially inner sides thereof at predetermined angular intervals (60°). Cylindrical collars 81 of predetermined length are interposed between the pin holes 34 and the pin holes 44, and cylindrical collars 82 of predetermined length are interposed between the pin holes 35 and the pin holes 45. The front plate 30 and the rear plate 40 are integrally fastened by pins 83 inserted through the pin holes 34, collars 81 and pin holes 44, and pins 84 inserted through the pin holes 35, collars 82 and pin holes 45, whereby they are spaced from each other in the forward-rearward direction by the lengths of the collars 81 and 82.

Multiple (6 each in the drawing) spring housings 36 and 46 for housing the second elastic member 5 are formed circumferentially in the front plate 30 and the rear plate 40, respectively, at predetermined angular intervals (60°), and multiple (6 each in the drawing) spring housings 37 and 47 for housing the third elastic member 7 are formed circumferentially therein at predetermined angular intervals (60°). Like the first elastic member 4, the second elastic member 5 and third elastic member 7 are composed of coil springs. For example, the second elastic member 5 can be composed of coil springs of larger diameter and length than those of the third elastic member 7, and the first elastic member 4 can be constituted of coil springs of larger diameter and length than those of the second elastic member 5. However, the dimensions of the springs of the elastic members 4, 5 and are not limited by this example.

The spring housings 36 and 37 of the front plate 30 are formed by press working so as to have openings 36a and 37a formed to predetermined circumferential lengths and predetermined radial lengths, and pairs of covers 36b and 37b bent forward from radially inward side rims and radially outward side rims of the openings 36a and 37a. Similarly, the spring housings 46 and 47 of the rear plate 40 are formed by press working so as to have openings 46a and 47a, and pairs of covers 46b and 47b bent rearward from rims of the openings 47a and 47a.

The covers 36b and 46b are formed to project in a curved shape corresponding to the peripheral surface shape of the second elastic member (springs) 5, and the covers 37b and 47b are formed to project in a curved shape corresponding to the peripheral surface shape of the third elastic member (springs) 7. But the spring housings 36, 37, 46 and 47 are not required to be formed circumferentially and can instead be formed tangentially to circles centered on the axis CL0.

The output plate 60 is substantially ring-shaped and has an inner peripheral surface 61 and an outer peripheral surface 62, both centered on the axis CL0. The inner peripheral surface 61 is positioned radially inward of the inner peripheral surfaces 31 and 41 of the front plate 30 and rear plate 40 and is fitted on a cylindrical surface 19c on the front side of the flange 19a of the turbine hub 19. As a result, the output plate 60, in a state positioned on the turbine hub 19, is fixed on the flange 19a by fastening members 19b passed through multiple circumferentially spaced through-holes 63. Multiple (6 pieces) first slotted holes 64 of predetermined peripheral direction length are formed circumferentially in the output plate 60 at predetermined angular intervals (60°) and at the same radial positions as the spring housings 36 and 46 of the front plate 30 and rear plate 40. In addition, multiple (6 pieces) second slotted holes 65 of predetermined peripheral direction length are formed circumferentially at predetermined angular intervals (60°) and at the same radial positions as the pin holes 35 and 45 of the front plate 30 and rear plate 40.

Alternatively, the first slotted holes 64 can be formed tangentially to a circle centered on axis CL0 rather than being formed circumferentially. Circumferential or tangential direction length of the first slotted holes 64 is substantially equal to circumferential or tangential direction length of the spring housings 36 and 46 of the front plate 30 and the rear plate 40, and the radial length (width) of the first slotted holes 64 is substantially equal to the outside diameter of the second elastic member (springs) 5. As a result, the second elastic member (springs) 5 pass through the first slotted holes 64 to be accommodated in the spring housings 36 and 46, and the opposite ends of the second elastic member (springs) 5 are supported between the spring housings 36 and 46 and the first slotted holes 64.

On the other hand, the radial length (width) of the second slotted holes 65 is substantially equal to the outside diameter of the collars 82. Therefore, the collars 82 are movable along the second slotted holes 65 in the circumferential direction, so that the output plate 60 is rotatable around the axis CL0 relative to the front plate 30 and the rear plate 40. As a result, torque input to the front plate 30 and rear plate 40 is transmitted through the second elastic member 5 to the output plate 60.

The connecting plate 50 is substantially ring-shaped and has an inner peripheral surface 51 and an outer peripheral surface 52, both centered on the axis CL0. The outer peripheral surface 52 is located radially outward of the outer peripheral surfaces 32 and 42 of the front plate 30 and rear plate 40. Thickness (forward-rearward direction length) of the connecting plate 50 is the same as thickness of the output plate 60. Diameter of the inner peripheral surface 51 of the connecting plate 50 is substantially equal to diameter of the outer peripheral surface 62 of the output plate 60, and the connecting plate 50 is fitted onto and supported by the outer peripheral surface 62 of the output plate 60. Multiple (6 pieces in the drawing) first notched holes 53 and multiple (6 pieces in the drawing) second notched holes 54 are provided circumferentially in the inner peripheral surface 51 of the connecting plate 50, alternately at predetermined angular intervals (60°) phase-shifted by half the pitch (30°).

The first notched holes 53 and second notched holes 54 are formed from the inner peripheral surface 51 toward the radially outer side to have approximately rectangular shape as seen in plan view. Circumferential or tangential direction length of the first notched holes 53 is substantially equal to circumferential or tangential direction length of the spring housings 37 and 47 of the front plate 30 and rear plate 40. This length is a predetermined amount shorter than the natural length of the third elastic member 7. The radial length of the first notched holes 53 is substantially equal to the outside diameter of the third elastic member 7. As a result, the third elastic member 7 passes through the first notched holes 53 in a state shrunk a predetermined amount from its natural length to be accommodated in the spring housings 37 and 47, and the opposite longitudinal ends of the third elastic member 7 are supported between the spring housings 37 and 47 and the first notched holes 53.

Thus in the present embodiment, the third elastic member 7 is supported by the spring housings 37 and 47 and the first notched holes 53, and these constitute the spring support 8 of FIG. 2. Moreover, in the initial state before engine rotation, the third elastic member 7 is set in a state shrunk a predetermined amount from the natural length, thereby applying a predetermined preset load T0 to the third elastic member 7.

On the other hand, the second notched holes 54 are formed to predetermined radial and circumferential lengths, and the collars 81 are inserted through the second notched holes 54. The collars 81 are movable along the second notched holes 54 in the circumferential direction, whereby the connecting plate 50 can be rotated around the axis CL0 relative to the rear plate 40 and the front plate 30. As a result, torsional vibration input to the front plate 30 and rear plate 40 acts on the third elastic member 7 and connecting plate 50 serving as a dynamic damper. A ring-shaped mass body 55 is attached by pins 56 to a radially outer end portion of the rear surface of the connecting plate 50 so as to be centered on the axis CL0.

In the aforesaid torque transmission apparatus 100, torque input from the engine to the clutch piston 21 when the lock-up clutch 20 is engaged is transmitted through the first elastic member 4 to the front plate 30 and rear plate 40 and is further transmitted through the second elastic member 5 to the output plate 60 and turbine hub 19. As a result, torsional vibration transmitted from the engine to the input shaft of the transmission can be attenuated by the first elastic member 4 and second elastic member 5.

At this time, torsional vibration from the engine also acts on the connecting plate 50 and mass body 55 through the third elastic member 7 connected to the front plate 30 and rear plate 40. Damping effect is therefore enhanced because vibration can also be attenuated by a dynamic damper. Moreover, owing to the fact that the predetermined preset load T0 is applied to the third elastic member 7, damping performance can be enhanced by broadly expanding the range of engine speeds over which the damping effect of the dynamic damper can be obtained.

The present embodiment of the invention can achieve advantages and effects such as the following:

(1) The torque transmission apparatus 100, which transmits torque from the first rotor 1 rotating around the axis CL0 to the second rotor 2, includes the intermediate member 3 disposed in the power transmission path PA between the first rotor 1 and second rotor 2; the first elastic member 4 and the second elastic member 5 respectively interposed between the first rotor 1 and intermediate member 3 and between the intermediate member 3 and the second rotor 2; the inertial body 6 connected to the intermediate member 3 through the third elastic member 7; and the spring support 8 which supports the third elastic member 7 to be expandable and contractible (FIG. 2). In addition, the spring support 8 supports the third elastic member 7 in a manner of applying the initial load T0 to the third elastic member 7, in an initial state that the first rotor 1 and the second rotor 2 is non-rotating (FIG. 2).

Since apparent spring constant of the third elastic member 7 therefore exhibits variability, damper frequency fdd changes in response to engine speed N, making it possible for damper frequency fdd to approach excitation frequency over a broad range of engine speeds (FIG. 7). Consequently, good damping effect by dynamic damping can be achieved with respect to a broad range of excitation frequencies.

(2) When first frequency fs and second frequency α·fs obtained by multiplying the first frequency by a predetermined coefficient α greater than 1 are respectively set as lower limit frequency and upper limit frequency of a vibration attenuation region, the spring support 8 applies initial preset load T0 and supports the third elastic member 7 so that ratio of initial load T0 applied to the third elastic member 7 (T0/k0) becomes larger than the value obtained by dividing ½ times of maximum amplitude θdd of torsion angle θ of the inertial body 6 with respect to the intermediate member 3 by the square of predetermined coefficient α and becomes a smaller value than ½ times of maximum amplitude (torsion angle amplitude) θdd of torsion angle of the inertial body 6 with respect to the intermediate member 3 (the equation (XII)). By setting ratio T0/k0 of initial load T0 to spring constant k0 in the predetermined range in this manner, still better vibration damping effect by dynamic damping can be achieved with respect to excitation frequencies ranging from first frequency fs to second frequency α·fs.

(3) The spring support 8 applies initial load T0 and supports the third elastic member 7 so that ratio of initial load T0 applied to the third elastic member 7 to spring constant k0 of the third elastic member 7 (T0/k0) becomes larger than 0 and smaller than ½ times of maximum amplitude (torsion angle amplitude) θdd of torsion angle θ of the inertial body 6 with respect to the intermediate member 3 (the equation (XIII)). As a result, still better vibration damping effect by dynamic damping can be achieved with respect to a still broader range of excitation frequencies.

(4) The intermediate member 3 includes the pair of plate members constituted of the front plate 30 and the rear plate 40 which are integrally connected and extend radially in parallel, and the third elastic member 7 and connecting plate 50 are interposed between the plate members 30 and 40 (FIG. 13). Since the intermediate member 3 provided between the first elastic member 4 and the second elastic member 5 thus includes the pair of plate members 30 and 40, installation space of the intermediate member 3 can be minimized, and the third elastic member 7 and the connecting plate 50 constituting part of inertial body 6 can be situated without axially projecting from either axial end face of the intermediate member 3.

(5) The torque transmission apparatus 100 is deployed between the clutch piston 21 constituting part of the lock-up clutch 20 and the shell 12a of the turbine runner 12 constituting part of the torque converter 10, whereby it transmits torque from the engine through the lock-up clutch 20 of the torque converter 10 to the transmission, while the first rotor 1 is constituted by the clutch piston 21 and the second rotor 2 is constituted by the output plate 60 that rotates integrally with the input shaft of the transmission (FIGS. 1 and 13). As a result, vibration caused by rotational vibration of the engine in a broad range of excitation frequencies can be favorably reduced during engagement of the lock-up clutch.

(6) The torque converter 10 includes the torque transmission apparatus 100, the pump impeller 11 input with torque from the engine, the cover 18 fixed on the pump impeller 11, the turbine runner 12 arranged opposite the pump impeller 11, the lock-up clutch 20 including the clutch piston 21 arranged opposite the side wall of the cover 18 to engage with the cover 18 and disengage from the cover 18 by driving of the clutch piston 21, and the turbine hub 19 which outputs torque from the engine through the lock-up clutch 20 and the torque transmission apparatus 100 to the transmission (FIG. 1). Since the torque transmission apparatus 100 can therefore be space-efficiently installed in the internal space of the torque converter 10 (inside the cover 18), size-enlargement of the torque converter 10 can be prevented.

In the above embodiment, the third elastic member 7 is inserted through the first notched holes 53 of the connecting plate 50 to be accommodated in the spring housings 37 and 47 of the front plate 30 and rear plate 40 under application of predetermined initial load T0, and the connecting plate 50 is connected to the front plate 30 and rear plate 40 through the third elastic member 7. In other words, the connecting plate 50 and spring housings 37 and 47 are used as the spring support 8. However, the elastic member supporter for supporting the intermediate member 3 to be expandable and contractible is not limited to this configuration. In the above embodiment, the spring support 8 applies initial load T0 to and supports the third elastic member 7 so that the ratio of initial load T0 applied to the third elastic member 7 to the spring constant k0 of the third elastic member 7 satisfies the above equation (XII) or the above equation (XIII). However, the elastic member supporter can be of any structure insofar as, in an initial non-rotating state of the first rotor and second rotor, it supports the intermediate member 3 in a state that an initial load is applied to the intermediate member 3. In the initial non-rotating state, no torque acts on the first rotor and the second rotor, and the third elastic member is in a neutral state.

In the above embodiment, although the intermediate member 3 is constituted by a pair of plates (front plate 30 and rear plate 40) extending orthogonally to the axis CL0, the intermediate member is not limited to this structure. In the above embodiment, although the inertial body 6 is constituted by the connecting plate 50 and the mass body 55, the mass body can be omitted and the inertial body be constituted solely by the connecting plate 50 serving as an inertial plate member. In other words, at least part of the inertial body 6 can be located between a pair of plate members. Similarly, at least part of the third elastic member 7 can be located between a pair of plate members. In the above embodiment, the inner peripheral surface 51 of the connecting plate 50 is slidably supported on the outer peripheral surface 62 of the output plate 60, a manner of support of an inertial plate member with respect to an output plate member is not limited to this arrangement.

In the above embodiment, although the first elastic member 4, second elastic member 5 and third elastic member 7 are all composed of coil springs, at least one of them can be composed of another kind of elastic member. In the above embodiment, the third elastic member 7 is composed of coil springs, and in an initial non-rotating state of the first rotor 1 and second rotor 2, the third elastic member 7 is supported by the spring support 8 shrunk a predetermined amount from its natural length. However, in a case where, for example, the third elastic member 7 is composed of an elastic member other than coil springs, an initial load can be applied to the elastic member without shrinking the elastic member in the initial state.

In the above embodiment, the torque transmission apparatus 100 is applied to the lock-up clutch 20 of the torque converter 10 to transmit rotation from the engine through the lock-up clutch 20 of the torque converter 10 to the transmission. In other words, the torque transmission apparatus 100 is applied to the power transmission path from the clutch piston 21 to the input shaft of the transmission when the lock-up clutch is engaged. However, the torque transmission apparatus can be similarly applied at other places where torque from the first rotor is transmitted to the second rotor. Therefore, the first rotor can be constituted by a rotor other than the clutch piston, and the second rotor can be constituted by a rotor other than an output plate which rotates integrally with the input shaft of the transmission. For example, the first rotor can be constituted by a rotor which rotates integrally with the clutch piston, and the second rotor can be constituted by the turbine hub or the input shaft of the transmission. In other words, the first rotor and the second rotor are not limited to the above structures.

It is also possible to input torque to the first rotor from a power source other than an engine and to output the input torque to a driven component other than a transmission. The clutch piston 21 constituting a piston member and the cover 18 constituting a cover member are not limited to the above structures. The torque transmission apparatus can be located at a position other than between the clutch piston and shell of the turbine runner inside a cover member.

The above embodiment can be combined as desired with one or more of the aforesaid modifications. The modifications can also be combined with one another.

According to the present invention, since the third elastic member connected to the intermediate member is supported in a state that an initial load is applied, good damping effect by dynamic damping can be achieved with respect to a broad range of excitation frequencies.

Above, while the present invention has been described with reference to the preferred embodiments thereof, it will be understood, by those skilled in the art, that various changes and modifications may be made thereto without departing from the scope of the appended claims.

What is claimed is:

1. A torque transmission apparatus, comprising:
an intermediate member disposed in a power transmission path between a clutch piston and an output plate;
a first elastic member interposed between the clutch piston and the intermediate member, and configured to transmit torque from the clutch piston to the intermediate member;
a second elastic member interposed between the intermediate member and the output plate, and configured to transmit torque from the intermediate member to the output plate;
a third elastic member that is radially outside of the second elastic member, and radially inside of the first elastic member;
an inertial body connected to the intermediate member through the third elastic member; and
an elastic member supporter configured to support the third elastic member to be expandable and contractible,
wherein the elastic member supporter supports the third elastic member in a manner of applying an initial load to the third elastic member, in an initial state of the first and second rotors being non-rotating.

2. The torque transmission apparatus according to claim 1, wherein the elastic member supporter supports the third elastic member so that a ratio of the initial load applied to the third elastic member with respect to a spring constant of the third elastic member becomes larger than a value obtained by dividing 0.5 times a maximum amplitude of torsion angle of the inertial body with respect to the intermediate member by a square of a predetermined coefficient greater than 1, and becomes smaller than 0.5 times the maximum amplitude of the torsion angle of the inertial body with respect to the intermediate member, under a condition that a first excitation frequency and a second excitation frequency obtained by multiplying the first excitation frequency by the predetermined coefficient are respectively set as a lower limit frequency and an upper limit frequency of a vibration damping region.

3. The torque transmission apparatus according to claim 1, wherein the elastic member supporter supports the third elastic member, so that a ratio of the initial load applied to the third elastic member with respect to a spring constant of the third elastic member becomes larger than 0 and smaller than 0.5 times of a maximum amplitude of torsion angle of the inertial body with respect to the intermediate member.

4. The torque transmission apparatus according to claim 1, wherein the intermediate member includes a pair of plate members extending in parallel to each other in a radial direction and integrally connected with each other, and
at least part of the third elastic member and the inertial body is interposed between the pair of plate members in the axial direction.

5. The torque transmission apparatus according to claim 4, wherein the inertial body includes an inertial plate member interposed between the pair of plate members in the axial direction in a manner rotatable with respect to the pair of plate members and extending from the third elastic member outward in the radial direction.

6. The torque transmission apparatus according to claim 5, wherein the output plate is interposed between the pair of plate members in the axial direction in a manner rotatable with respect to the pair of plate members; and
wherein an outer peripheral surface of the output plate is inside the third elastic member in the radial direction.

7. The torque transmission apparatus according to claim 6, wherein an inner peripheral surface of the inertial plate member is slidably supported on the outer peripheral surface of the output plate.

8. The torque transmission apparatus according to claim 5, wherein the inertial body further includes a ring-shaped mass body provided at an outer end portion of the inertial plate member.

9. The torque transmission apparatus according to claim 1, wherein the torque transmission apparatus is placed between the clutch piston of a lock-up clutch of a torque converter and a shell of a turbine runner of the torque converter so as to transmit a torque from a power source through the lock-up clutch to a transmission.

10. A torque converter, comprising:
the torque transmission apparatus according to claim 1;
a pump impeller to which a torque from a power source is input;
a cover fixed on the pump impeller;
a turbine runner arranged opposite the pump impeller;
a lock-up clutch including the clutch piston arranged opposite a side wall of the cover to be engaged with the cover or disengaged from the cover by driving of the clutch piston; and
a turbine hub configured to output the torque from the power source through the lock-up clutch and the torque transmission apparatus to a driven component.

11. A torque transmission apparatus, comprising:
an output plate that rotates integrally with an input shaft of a transmission about an axis;
a front plate and a rear plate that constitute an intermediate member, wherein the front plate and the rear plate are connected and extend radially in parallel, with the output plate interposed between the front plate and the rear plate in the axial direction;
first elastic members disposed between the front plate and a clutch piston that rotates with an output shaft of an engine, and configured to transmit torque from the clutch piston to the front plate;
second elastic members disposed between the output plate and the intermediate member, and configured to transmit torque from the intermediate member to the output plate;
a connecting plate that is ring-shaped and is slidably supported on an outer peripheral surface of the output plate;
a ring-shaped mass body attached to a radially outer end portion of the connecting plate; and
third elastic members disposed between the connecting plate and the intermediate member, and configured to transmit torque from the intermediate member to the connecting plate.

12. The torque transmission apparatus of claim 11 wherein:
the front plate includes first spring housings formed circumferentially at angular intervals to support the third elastic members;
the second plate includes second spring housings formed circumferentially at the angular intervals to support the third elastic members; and
the connecting plate includes notched holes formed circumferentially at the angular intervals to support the third elastic members;
wherein lengths of the first spring housings, the second spring housings, and the notched holes are shorter than the natural length of the third elastic members to apply preset loads to the third elastic members.

13. The torque transmission apparatus of claim 11 wherein:
the front plate includes spring supports formed circumferentially to project from an outer peripheral surface of the front plate at angular intervals; and
the spring supports of the front plate contact one longitudinal end of the first elastic members while the clutch piston contacts the opposing longitudinal end of the first elastic members.

14. The torque transmission apparatus of claim 11 wherein:
the front plate includes first spring housings formed circumferentially at angular intervals to support the second elastic members;
the second plate includes second spring housings formed circumferentially at the angular intervals to support the second elastic members; and
the output plate includes slotted holes formed circumferentially at the angular intervals to support the second elastic members.

15. The torque transmission apparatus of claim 11 wherein:
the first elastic members comprise first coil springs, the second elastic members comprise second coil springs, and the third elastic members comprise third coil springs;
the second coil springs have a larger diameter and length than the third coil springs; and
the first coil springs have a larger diameter and length than the second coil springs.

16. A torque converter, comprising:
a cover connected to the output shaft of the engine;
a pump impeller connected to the cover, and rotatable about the axis;
a turbine runner that faces the pump impeller, and is rotatable about the axis;
a turbine hub connected to the turbine runner and to the input shaft of the transmission; and
a lock-up clutch that comprises:
the clutch piston configured to frictionally engage with the cover; and
the torque transmission apparatus of claim 11 installed between the clutch piston and the turbine hub.

17. A torque transmission apparatus, comprising:
an intermediate member disposed in a power transmission path between a clutch piston and an output plate;
a first elastic member interposed between the clutch piston and the intermediate member, and configured to transmit torque from the clutch piston to the intermediate member;
a second elastic member interposed between the intermediate member and the output plate, and configured to transmit torque from the intermediate member to the output plate;

a third elastic member; and an inertial body connected to the intermediate member through the third elastic member;

wherein the intermediate member includes a pair of plate members extending in parallel to each other in a radial direction and integrally connected with each other, wherein at least part of the third elastic member and the inertial body is interposed between the pair of plate members in the axial direction.

18. The torque transmission apparatus of claim 17 further comprising:

an elastic member supporter configured to support the third elastic member to be expandable and contractible, wherein the elastic member supporter supports the third elastic member in a manner of applying an initial load to the third elastic member, in an initial state of the first and second rotors being non-rotating.

19. The torque transmission apparatus of claim 17 wherein:

the inertial body includes an inertial plate member interposed between the pair of plate members in the axial direction in a manner rotatable with respect to the pair of plate members and extending from the third elastic member outward in the radial direction.

20. The torque transmission apparatus of claim 17 wherein:

the first elastic member comprises a first coil spring, the second elastic member comprises a second coil spring, and the third elastic member comprises a third coil spring;

the second coil spring has a larger diameter and length than the third coil spring; and the first coil spring has a larger diameter and length than the second coil spring.

* * * * *